(12) United States Patent
Hand et al.

(10) Patent No.: US 7,103,843 B2
(45) Date of Patent: Sep. 5, 2006

(54) METHOD AND APPARATUS FOR VISUALIZING METRICS IN A DATA SPACE

(75) Inventors: Leonard S. Hand, Ft. Worth, TX (US); Jeffery R. Washburn, Roanoke, TX (US)

(73) Assignee: International Business Machines Corporation, Armonk, NY (US)

( * ) Notice: Subject to any disclaimer, the term of this patent is extended or adjusted under 35 U.S.C. 154(b) by 399 days.

(21) Appl. No.: 09/865,368

(22) Filed: May 25, 2001

(65) Prior Publication Data

US 2002/0175941 A1    Nov. 28, 2002

(51) Int. Cl.
G06F 3/00    (2006.01)
G06F 15/173    (2006.01)

(52) U.S. Cl. .................. 715/734; 715/744; 709/223

(58) Field of Classification Search ............... 345/733, 345/734, 736, 738, 764, 853, 854, 771, 772, 345/744; 709/200, 223, 224; 715/734, 853, 715/744
See application file for complete search history.

(56) References Cited

U.S. PATENT DOCUMENTS

| | | | | |
|---|---|---|---|---|
| 4,901,221 A | * | 2/1990 | Kodosky et al. | 345/771 |
| 5,261,044 A | * | 11/1993 | Dev et al. | 345/855 |
| 5,483,631 A | * | 1/1996 | Nagai et al. | 345/736 |
| 5,623,590 A | * | 4/1997 | Becker et al. | 345/772 |
| 6,046,742 A | * | 4/2000 | Chari | 715/734 |
| 6,054,987 A | * | 4/2000 | Richardson | 345/734 |
| 6,141,325 A | * | 10/2000 | Gerstel | 370/238 |
| 6,198,479 B1 | * | 3/2001 | Humpleman et al. | 715/733 |
| 6,225,999 B1 | * | 5/2001 | Jain et al. | 345/734 |
| 6,272,150 B1 | * | 8/2001 | Hrastar et al. | 370/486 |
| 6,292,184 B1 | * | 9/2001 | Morgan | 345/600 |
| 6,466,971 B1 | * | 10/2002 | Humpleman et al. | 709/220 |
| 6,493,002 B1 | * | 12/2002 | Christensen | 345/779 |
| 6,496,209 B1 | * | 12/2002 | Horii | 345/853 |
| 6,546,263 B1 | * | 4/2003 | Petty et al. | 455/566 |

\* cited by examiner

Primary Examiner—Kieu D. Vu
Assistant Examiner—Ting Zhou
(74) Attorney, Agent, or Firm—Akerman-Senterfitt

(57) ABSTRACT

The present invention discloses a method and apparatus for dynamically monitoring and visualizing metrics within a system that has values which change over time. The values associated with these metrics can be specific to entities within the system or they can be common system-wide metrics. Various attributes can be defined for the metrics to be visualized. The values can then be determined in conformance with these defined data attributes. The values can be mapped to appropriate unique indicators which can be used to represent a visual indication of the determined value. The graphical representation of the entities within the system can be displayed along with unique indicator used to represent the value associated with the metric to be displayed. The metrics to be displayed can be selected from a list. Additionally, the measurements can be periodically made and the display accordingly updated.

38 Claims, 3 Drawing Sheets

METHOD AND APPARATUS FOR VISUALIZING METRICS IN A DATA SPACE

BACKGROUND OF THE INVENTION

1. Technical Field

The present invention relates to the field of data monitoring and presentation, and more particularly, to a method and apparatus for visualizing metrics within a system on a single map display.

2. Description of the Related Art

Monitoring system performance can provide engineers and system operators with time critical information that can often help to alleviate or avert catastrophe and also design better systems. This is especially true for complex heterogeneous systems. Complex heterogenous systems are systems that can have entities and components that are diverse in their functionality and operability. In these complex heterogenous systems, it can often be necessary to monitor metrics defined for these systems in order to ensure that the components or entities in the system are functioning optimally. A metric is a standard of measurement that can be used for mathematical or statistical analysis. Metrics can include performance data or configuration information that can be used to setup software or hardware parameters. As the size of complex heterogeneous systems increase, so does the complexity of monitoring various metrics. Moreover, as complex heterogeneous systems become more diverse, it can become progressively more difficult to collect and analyze the various metrics collected.

For example, in complex heterogeneous systems, it can be necessary to monitor realtime performance to ensure that the network functions optimally. A content delivery network (CDN) or system is an example of a complex heterogeneous system and can include e-Business systems and communication networks. Since the CDN can consist of entities and diverse components, the size and heterogeneous characteristics of these CDNs can make it extremely difficult to perform real time analysis. Entities and components can include, but are not limited to servers, switches, routers, caches, load dispatchers (LD) and traffic managers. As a result, it is often required to perform tests on a scalable version of the network. Even then, personnel and expertise are required 0 to dutifully monitor each component, entity or subsystem of the network, along with any associated applications databases and platforms. This post analysis monitoring can be time extremely consuming and very expensive.

Even in cases when performance metrics or attributes are collected, the collected data must be analyzed and presented in a manner that facilitates easy interpretation. Monitoring realtime performance requires simultaneous assessment of the performance metrics for all of the components or entities forming the CDN. Realtime values of the performance associated attributes must be available in order to determine what attributes are causing a bottleneck and what components, entities or subsystems might have resources available to accommodate additional traffic.

A similar problem can exist in other complex heterogeneous systems such as computing system environments. In these systems, it is often necessary to monitor certain system metrics in order to ensure optimal performance of the system. For example, it might be necessary to monitor performance metrics for an Operating System (OS) running on a platform. However, as the size and complexity of the software, related databases, and the number of users accessing such systems increases, the collection and analysis of metrics becomes more difficult.

SUMMARY OF THE INVENTION

The invention discloses a method and system for monitoring and visualizing a plurality of metrics in a dynamic data space. The method includes defining metrics corresponding to at least one entity within the dynamic data space. A value can be determined for each of the defined metrics. A graphical display representation can be provided for certain selected values in a graphical user interface. The graphical user interface can change in order to reflect changes that occur in the selection of the metrics. The metrics can be defined by quantizing discrete levels between a maximum and minimum value defined for the metrics. A unique indicator can be assigned to each quantized discrete level. The unique indicator assigned to the quantized discrete levels can be a different shade, or pattern, or a combination thereof.

In determining the values for each metric, each entity within the dynamic data space can be interrogated to obtain the value of the metric for that entity. The determination can include automatically updating the graphical display representations of selected determined values. The determining step and the step of providing the graphical display representations can be configured to occur periodically. Graphical display representations can be provided for each entity within the dynamic data space. The graphical representations can be modified with a visual indicator that corresponds to the determined value for the metrics. The graphical representations can be dynamically updated based upon subsequent determinations of the metric values.

In another aspect of the invention, a method is described for visualizing metrics for a component in a heterogeneous content delivery network (CDN) or system, for example, a communications network. The method can include defining metrics that characterize the performance of the component in the network. Values can be computed for the defined metrics and a graphical display can be provided for displaying the computed values. The graphical display can display certain selected defined metrics and the graphical display can change in response to changes in the computed values which result from changes in the components. Defined metrics can include CPU load, a run queue size, and a disk I/O usage, memory usage, connections, or any combination thereof.

The metrics can be defined by quantizing discrete levels between a maximum and a minimum value defined for each of the metrics. A unique indicator can be assigned to each quantized discrete level. The unique indicator assigned to the quantized levels can be a different color, a different shade, a different pattern, or any combination thereof.

In computing the values for the defined metrics, each of the components in the heterogeneous communications network can be interrogated to acquire updated values for the metrics. In providing the graphical display, a graphical representation of each of the components can be provided in the display, and each component can be represented by a node in the graphical display. The graphical representations can be updated dynamically based upon subsequent value determinations. The computing step and providing step can be configured to occur periodically. The graphical display can be modified by a visual indicator corresponding to the computed values. The metrics displayed in the graphical display can be selected from a list of metrics and the graphical display can change in response to changes made in the list as well as to periodic updates of the metric values.

In another aspect of the invention, a method is disclosed for monitoring a component in a content delivery network.

For example, the performance of a component in a computer communications network could be monitored. The method includes selecting a performance metric corresponding to a component in the network and determining a value for the selected metric. A display indicator can be computed based on the determined value and displayed on a graphical display. The display indicator can provide a visual representation of the monitored metric for the component in the network. The monitored metric can be performance data which can include a CPU load, a network capacity, a run queue size, a connection capacity, a memory usage, a page ins capacity, a disk I/O, a reference count, or any combination thereof. The display indicator can be a color, a shade of gray, or a pattern, or any combination thereof. In computing the display indicator, a discrete quantized level can be assigned to values between a predefined maximum and predefined minimum value for each of the metrics. A display indicator can be selected based on the assigned quantized level.

In yet a further aspect of the invention, a system for monitoring components in a computer communications network is disclosed. The monitoring can include monitoring performance metrics or monitoring configuration information. The system can include an agent for retrieving values for metrics from the components and a processor for determining a graphical representation for each retrieved value. A graphical user interface can be utilized for presenting the determined graphical representation and the graphical user interface can have a list of the metrics from which selections can be made. The graphical user interface can change to reflect changes to the selections.

Another aspect of the invention includes a machine readable storage having stored thereon, a plurality of code sections for visualizing metrics in a dynamic data space. The code sections are executable by a machine for causing the machine to perform the steps of defining metrics, each of which corresponds to at least one entity or component in the dynamic data space. A value can be determined for each of the defined metrics. A graphical display can be provided for displaying selected determined values in a graphical user interface. The graphical interface and/or display can change to reflect changes to the selections.

A further aspect of the invention disclosed a machine readable storage having stored thereon, a computer program having a plurality of code sections for visualizing metrics for at least one component in a complex heterogeneous CDN. The code sections are executable by a machine for causing the machine to perform the steps of defining metrics characterizing the performance of the component in the CDN and computing values for said defined metrics. A graphical display can be utilized to display selected ones of the computed values and the graphical display can change in response to changes in the computed values and components or entities. This change can be dynamic.

Another aspect of the invention discloses a machine readable storage having stored thereon, a computer program having a plurality of code sections for monitoring a component in a CDN. The code sections are executable by a machine for causing the machine to perform the steps of selecting one or more monitored metric corresponding to a component in the CDN and determining a value for the selected metric. A display indicator can be calculated based on the determined value. The display indicator which can be visual representation of the monitored metric for a specified component in the CDN, can be displayed on a graphical display.

BRIEF DESCRIPTION OF THE DRAWINGS

There are presently shown in the drawings embodiments of which are presently preferred, it being understood, however, that the invention is not so limited to the precise arrangements and instrumentalities shown, wherein.

DETAILED DESCRIPTION OF THE INVENTION

The invention discloses a method and system for dynamically monitoring and visualizing realtime data metrics in complex heterogeneous systems. The performance of entities or components in a complex heterogeneous system can be monitored and visualized by collecting and displaying performance metrics in realtime on a graphical display map. Complex heterogeneous systems are systems that contain numerous diverse components and entities and seamlessly interoperate to provide one or more functions. Complex heterogeneous systems can include, but is not limited to, any combination of CDNs, computer networks, operating systems, databases, and communication systems. Data metrics are standards of measurements that can be used for mathematical or statistical analysis of these types of systems. Within a complex heterogeneous system, attributes of the metrics can be defined for the various components and entities within the system.

An attribute can be a specific type of data metric. The values associated with the defined attributes of the data metrics can be periodically collected from the entities within the system by using agents or bots (robots). An agent is an application or part thereof, that can be designed specifically to interface with, collect and report information on a device that is being monitored. Changes in the state of the attribute values collected by the agents can be used to indicate changes in the state of the components or entities in the system. The collection of remote information using agents is well known in the art. These values associated with the defined attributes for the data metrics can be mapped to symbolic representations based on the attributes. The symbolic representation can then be viewed on a graphical display. To visualize the operation of the heterogeneous system, the graphical display can be dynamically updated to reflect changes in the values of the data metrics.

Notably, the map display can have indicators which can represent the realtime values of system metrics such as performance data metrics. The performance data metrics which are displayed in the map can be selected from a list of data metrics. Notwithstanding, the invention is not limited to monitoring and visualization of realtime performance metrics for communication components and entities forming a complex heterogeneous network. Rather, the visualization of realtime performance metrics of communication components and entities forming an heterogeneous communications network is intended to teach one how to practice the invention.

Figure 1:
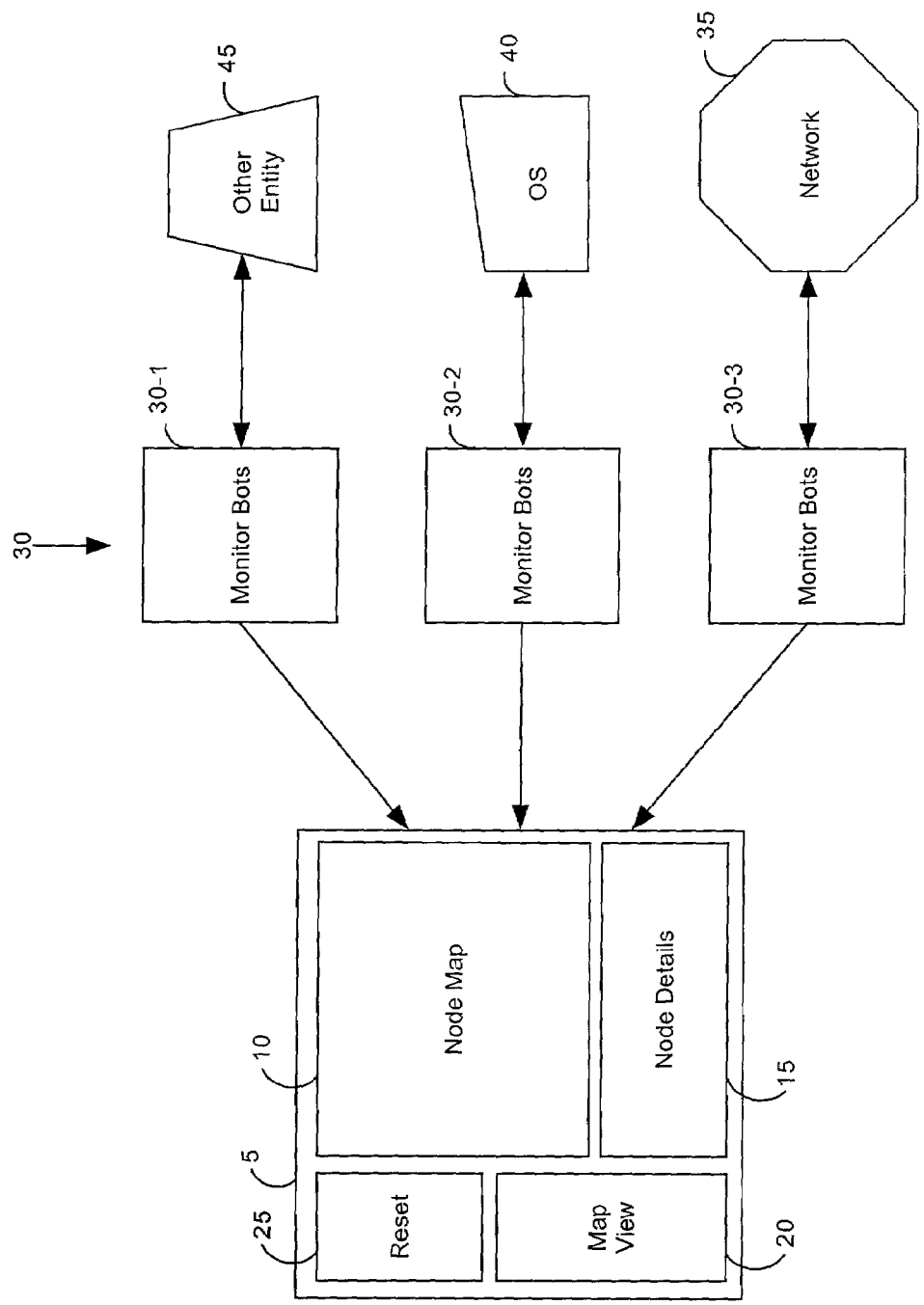
FIG. 1 is a block diagram illustrating an exemplary architecture for a Data Metric Map.

FIG. 1 is a block diagram, which illustrates an exemplary architecture for a data metrics map in accordance with the inventive arrangements. Two components of the architecture of FIG. 1 include the data metrics map display 5 and the supporting data metrics map components. The data metrics map display 5 can contain a node map display section 10, a node detail display section 15, a map view display section 20 and a reset display section 25. The data metrics map components can include a multitude of agents or monitor bots 30 (robots), such as bot 30-1, bot 30-2, and bot 30-3. Other components of the architecture can include the system to be monitored, which can be a network component 35, an operating system component 40, and a miscellaneous component 45, for example, a network, a database, an operating system and/or an application, respectively.

The data metrics map display 5 can be a graphical display window in a CRT, LCD, Plasma or LED screen which can be coupled to a computing device such as a workstation, a PC, a laptop. The map display 5 can be a GUI, for example, a Java based browser configured to process HTML, XML, WML, or data formatted using another suitable markup language. The data metrics map display 5 can be divided into a plurality of display window sections, each display section serving a specific function. The node map section 10, the node detail section 15, the map view section 20 and the reset section 25 all can be windows located within the map display 5.

The heterogeneous system to be monitored and for which data can be reported, can include a network 35 consisting of workstations and other network entities, for example, routers, databases, switches, bridges, and web application servers (WAS). The system for which metric values can be visualized also can include an operating system 40 and applications which can utilize the operating system. Exemplary computing platforms can include but are not limited to, PC, Miniframe, and Mainframe computers. A network management protocol can facilitate communications between the various components and entities forming the network. Network management protocols are known in the art and are used to monitor and maintain networks. Finally, the heterogeneous system to be monitored and for which data can be visualized can include other components or entities 45, such as databases, operating systems, load dispatchers, traffic managers and networks of communication devices.

In operation, the data metrics map display 5 can display a graphical representation of reported metrics from the components and entities within the system to be monitored. The map display 5 can dynamically change to reflect updated values for the reported metrics corresponding to the components and entities within the system being monitored. The graphical representation of the system components or entities can be displayed as icons or other suitable designators within the window of the node map section 10. In a further aspect of the invention, the graphical representation of the system components or entities displayed in node map section 10 can be connected by lines or placed in such a manner as to illustrate the relative communication relationships between the system being monitored and its components.

The node details display section 15 can display data metric values and other information pertaining to each component and entity in the heterogeneous system being monitored. The metrics collected for each of the components can be displayed, for example, in a chart, graph, or a table.

By comparison, the map view display section 20 can be used to control metrics to be reported, collected and displayed in the data metrics map display 5. The map view display section 20 can provide a list of the metrics to be selectively and displayed. In one aspect of the invention, only those metrics which have been selected in the list are displayed in the node details display section 15. In another aspect of the invention, the selected metrics can dictate which will be updated and/or colored in the map. In addition, the corresponding icons in the map display section 10 can be updated to indicate the updated value of the selected metrics.

The reset display section 25 can contain a selectable list of all the system components and entities. The selectable list of all the system components and entities can be used to reset all or particulars ones of the metrics in the node details display section 15 and the node map section 10. The reset function allows the metrics to be initialized or set to a default value.

In one aspect of the present invention, a maximum and a minimum value can be defined for each metric to be monitored and displayed. Various levels of quantized values can be defined for values falling between the defined maximum and the defined minimum value. Each of the quantized values can be mapped or assigned to a unique indicator. Notably, the unique indicator can be a color, varying shades of gray, and a pattern, or any combination thereof. A pattern, for example, can include variations of cross-hatched patterns. The unique indicator can be used in conjunction with the icon that represents an entity to represent the value of the metric for a particular entity. The unique indicator can be represented in the map view display section 20 where it can be used as a legend to reference the values indicated by the icons displayed in the map display section 10.

During a reporting phase, the data metrics map display 5 can receive updates of values pertaining to a particular metric from agents or bots 30-1, 30-2, 30-3, that monitor the components or entities 35, 40, 45 within the heterogeneous system. The updates of values pertaining to each metric can be the result of an interrogation from the bots 30-1, 30-2, 30-3 and can be contained within particular fields of an update message. In response to the interrogation from the agent or bots 30-1, 30-2, 30-3, the value of the requested metric can be sent to the agent or bot 30-1, 30-2, 30-3. This value of the metric can be used to update the data metrics map display 5. For example, bot 30-3 can interrogate a component of network 35 for a specific metric. In response to the interrogation request, the component of network 35 can supply the value of the requested metric to bot 30-3. The data metrics map can then be updated with the value through the reporting procedure.

Figure 3:
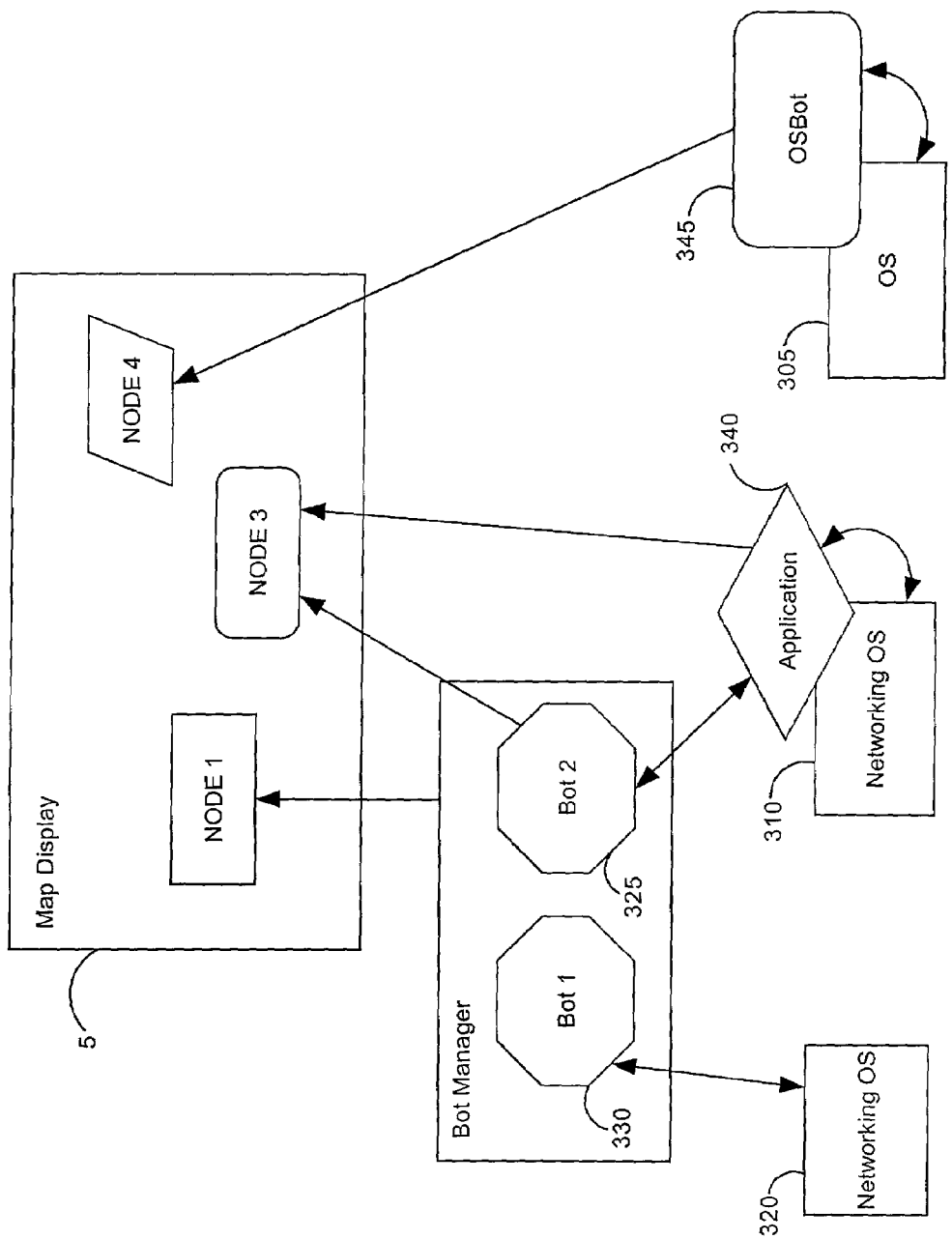
FIG. 3 is a diagram of an exemplary update process for a Data Metric Map used to monitor the CDN as shown in FIG. 2.

In a further aspect of the invention, the bots 30-1, 30-2, 30-3 can be managed by a single bot manager (shown in FIG. 3). For example, bots 30-1, 30-2 and 30-3 can be managed as a single entity. Hence, the bot manager can handle interrogation of the component or entities of the system and also update the values of the data metrics map based on the response of the interrogation.

Figure 2:
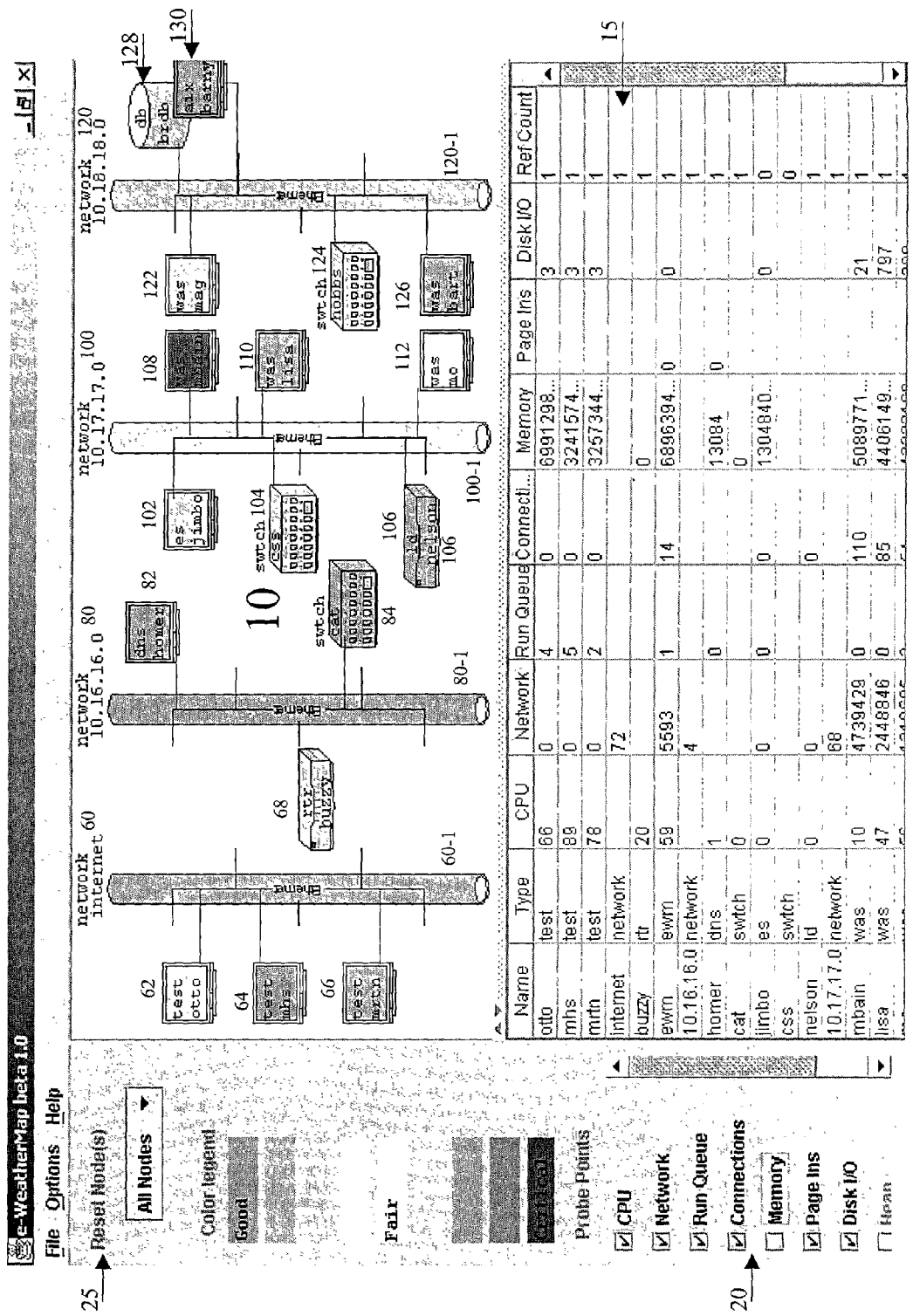
FIG. 2 is a detailed diagram of an exemplary Data Metric Map Display used to monitor a complex heterogeneous system such as a CDN.

There is shown in FIG. 2, a detailed diagram of an exemplary data metrics map display which can be used to monitor a complex heterogeneous system, for example a CDN or communications network. The data metrics map of FIG. 2 can be used to dynamically monitor the network components or entities of four networks, 60, 80, 100, and 120. Network 60, the Internet, can include three components or entities, namely, a work station "otto" 62, a work station "mhs" 64, a work station "mrtn" 66. Network 80, having an IP address of 10.16.16.0, can have 3 components or entities. Namely, a domain name server (DNS) "homer" 82, a switch (swtch) "cat" 84, and a router component (rtr) "buzzy" 68. Network 100, having an IP address of 10.17.17.0, can include 6 components or entities. Namely, an edge server "jimbo" 102, a switch 20 (swtch) "css" 104, a local director (ld) "nelson" 106, a web application server (WAS) "mbain"

108, a web application server (WAS) "lisa" 110, and a web application server (WAS) "mo" 112. Network 120, having an IP address of 10.18.18.0, can include 4 components or entities. Namely, a web application server (WAS) "mag" 122, a (swtch) "hobbs" 124, a web application server (WAS) "bart" 126, an AIX machine "barny" 130 and an database server "brdb" 128.

The graphical representation of the system components and entities to be displayed in the map display section 10 of the data metrics map can be icons. In one embodiment, a vertical cylindrical icon can be used to represent the backbone of the network. For example, the backbone of network 60 can be represented by a vertical cylindrical icon 60-1. The backbone of network 80 can be represented by a vertical cylindrical icon 80-1. The backbone of network 100 can be represented by a vertical cylindrical icon 100-1. The backbone of network 120 can be represented by a vertical cylindrical icon 120-1. An icon illustrating a monitor can used to represent workstations/servers within the communication system being monitored. For example, workstations 62, 64, 66, 82, 108, 110, 112, 122, 126, and 130 can be represented by a monitor icon. The workstation can be a PC, a laptop, a conventional diskless workstation or a conventional workstation having a disk. An icon of a router can be used to represent components or entities that function as routers in the system. For example, router 68 and local director 106 have similar icons. An icon of a switch can be used to represent switches in the system. For example, switches 84, 104, and 124 can be represented by the switch icon. The domain name server 82, edge server 102, and the web application servers 108, 110, 112 and 122 can be represented with a similar icon as a workstation. A conventional database icon can be used to represent database 128.

The node map section 10 can show the inter-relation between the various system components. For example, the components of network 80 can be shown to be associated to network 80 by connecting the router 68 icon, the domain name server 82 icon and the switch 84 icon by lines to the central backbone 80-1 icon. It should readily be understood that the icons are arbitrarily assigned and are not intended to be a limitation on the system.

The node detail display section 15 can display the name of the components or entities to be monitored and the value for the metrics. Referring to FIG. 2, the node detail display section 15 can be arranged in a tabular form. The name of the components or entities to be monitored can be located in the first column of the table. For example, the first entry, row one column 1, can contain the header "Name." The second entry, row 1 column 2, can contain the header "Type," which lists the type of component or entity. The components or entities along with their type can be listed respectively as shown: "otto" with a type of test, "mhsm" with a type of test, "mrtn" with a type of test, "Internet" with a type of network, "buzzy" with a type of router (rtr), "ewm" with a type of "ewm", 10.16.16.0 with a type of network, "homer" with a type of domain name server (DNS), "cat" with a type of switch (swtch), "jimbo" with a type of es, "css" with a type of switch (swtch), "nelson" with a type of local director, 10.17.17.0 with a type of network, "mbain" with a type of web application server (was), and "lisa" with a type of web application server (was).

The name of the metrics to be monitored for the components or entities can be placed in the first row of the table in the node detail section 15, starting at the third column. The names can be used as headers for each column. For example, the metrics to be monitored for each component or entity of the system can include, CPU usage (CPU), Network Usage (Network), Run Queue, Connections, Memory, Page Ins, and Disk I/O, respectively. The corresponding value of a metric for a specific component or entity can be located at the position where the metric column intersects the entity or component row.

The map view display section 20 can contain a list of probe points, for example, as shown under the heading Probe Points in FIG. 2. The probe points are the metrics that can be measured for the components or entities forming the system. Referring to FIG. 2, the list of probe points or metrics to be monitored can include: CPU usage (CPU), Network Usage (Network), Run Queue, Connections, Memory, Page Ins, Disk I/O. In one aspect of the invention, the probe points or metrics can be selectable. The selection of a probe point or metric can occur by placing a check mark next to the probe point or metric. The selection of the probe point or metric can determine which metric is displayed in the map display section 10 of the data metrics map. By having seven selectable probe points, for example, there can be or $2^n$ possible views for metrics of the components or entities forming the system.

As the updates containing the metric values for monitored components and entities are received, the corresponding locations in the table of the node detail section 15 can be dynamically updated. The update process can occur in realtime or it can be delayed. The node map display section 10 can also be updated whenever updated values for the metrics are received. Based on which probe points or metrics are selected in the map view display section 20, the appropriate icons representing the component or entity can be updated to reflect the updated value for the metric. As an illustrative example, the updated value for the CPU usage of WAS "mo" 112 is 7%. The attributes for the CPU usage can be defined as follows. The maximum CPU usage for the system can be 100% and the minimum can be 1%. The CPU usage can be quantized into discrete values and each discrete value represented by a different color as follows: 1–10%: DARK GREEN, 11%–20%: ORANGE, 21%–30%: YELLOW, 31%–40%: BLUE, 41%–50%: INDIGO, 51%–60%: VIOLET, 61%–70%: TEAL, 71%–80%: LIGHT GREEN, and 80%–100%: RED. The 80–100% range indicated in red can signify a critical state. The 41%–50% range represented in indigo, can represent a fair state. The 11%–20% range indicated in orange, can represent a good state. The 1%–10% range indicated in dark green, can represent an excellent state. Varying operating states can exist between these states. Since the updated value of the CPU usage for "mo" was 7%, the icon for 112 can be represented in the color dark green indicating that an excellent state exists for "mo." If the updated memory usage value for "mo" was 95%, leaving insufficient memory for the CPU to operate, and the memory was also selected in the map view display section 20, the icon 112 for "mo" can be changed to reflect the new value and critical range for memory usage in the node map display section 10.

It should be appreciated that different methods for accurately indicating multiple metrics values when many different metrics are selected for display can be employed. In one aspect of the invention, the metrics can be prioritized for display. As a result of this priority scheme, only the metric with the highest priority gets selected for display on the map. Hence, if CPU was given a higher priority than the memory usage, then the icon displayed in the node map section 10 for 'mo' would be dark green indicating that the CPU usage was within an excellent state. Still, selected metrics can be displayed on a rotating basis wherein each metric is displayed for a limited time and then another metric can be displayed. However, all selected metric values can be displayed in the table of the node detail section 15 of the map. In a further aspect of the invention, metric values that are displayed in the table of the node map section 10 can be colored and or made to flash in accordance with the value's corresponding state.

In a further aspect of the invention, whenever there are more than one critical states for an entity or component, the icon for that component or entity can be made to flash within the node map window 10 and/or the node detail window 15. During operation, a user will notice the flashing critical state and can then consult the node detail section 15 to determine the actual metrics that are causing the critical condition. Additionally, a user viewing the map display section 10 can uncheck the checked selection in the map view display section 20, and then reselect those probe points or metrics that were previously checked one at a time. This would instantly show each of the metrics causing the critical states as the metric is selected.

In accordance with the inventive arrangements, the agents or bots can be used to acquire values for the metrics and update the data metrics map accordingly. FIG. 3, is a block diagram illustrating three components of a network, namely, an operating system (OS) component 305, a networking OS component 310, and a networking OS component 320. The OS component 305 can contain an operating system bot 345 (OSBot) that can reside within an OS component 305. The OSBot 345 can interrogate the component directly and update the data metrics map metrics values for the OS component 305.

In operation, bot 1 (330) can interrogate networking OS Component 320 in order to acquire values for specified data metrics through bot 1 (330). In response to this interrogation request, the networking OS component 320 can send the value for the requested data metrics to bot 1 (330). On receipt of the updated value for the data metric, the bot 1 (330) can update the appropriate node, node 1, of the data metrics map with the updated value for the data metrics through a reporting procedure.

The networking OS component 310 can contain an application, for example, application 340. Application 340 can be integrated within the networking OS component 310 or it can reside externally to the networking OS component 310. In one aspect of the invention, the application 340 can interrogate networking OS component 310. Upon interrogation of the network OS component 310, application 340 can update node 3 of the map display 5. Moreover, bot 2 (325) can independently interrogate the networking OS component 310 for updated values for specified data metrics. Upon receipt of these updated value, bot 2 (325) can also update node 3 of the display map 5. It should be readily understood that although a bot, such as bot 2 (325), can interrogate a component or entity, a bot can otherwise influence a component or entity, for example by accessing that component or entity. The bot can acquire any updated data metrics and accordingly update a node.

The OS component 305 can contain an OSBot 345. The OSBot 345 can be integrated within the OS component 305 or it can reside externally. In operation, OSBot 345 can interrogate the OS component 305 for updated values for specified data metrics. On receipt of the updated values, the OSBot 345 can directly update the appropriate node, node 4, of the map display.

The present invention can be realized in hardware, software, or a combination of hardware and software. A method and system for dynamically monitoring and visualizing realtime data metrics in heterogeneous systems according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system is able to carry out these methods.

Computer program means or computer program in the present context means any expression, in any language, code or notation, of a set of instructions intended to cause a system having an information processing capability to perform a particular function either directly or after either or both of the following a) conversion to another language, code or notation; b) reproduction in a different material form.

While exemplary systems and methods embodying the present invention are shown by way of example, it should be understood that the invention is not limited to these embodiments. Modifications can be made by those skilled in the art, particularly in light of the foregoing teachings. For example, each of the elements of the aforementioned embodiments may be utilized alone or in combination with elements of the other embodiments.

The invention claimed is:

1. A method for monitoring and visualizing a plurality of metrics in a dynamic data space, the method comprising:

defining metrics, each of said defined metrics corresponding to at least one entity in the dynamic data space, wherein each entity is a network component;

defining a maximum and a minimum value for each of said metrics;

quantizing discrete levels between said defined maximum and said defined minimum value;

assigning a unique indicator to each of said quantized discrete levels;

determining a value for each of said defined metrics and responsively determining said unique indicator corresponding to said value;

receiving a user selection of particular ones of said entities via a graphical user interface;

providing graphical display representations of said unique indicators associated with said selected entities within a graphical user interface of a machine remotely located from said at least one entity, said graphical user interface changing to reflect changes to said selected entities and simultaneously displaying four distinct sections configured, respectively, as a node map section, a node detail section, a map view section, and a reset section;

displaying in said node map section a plurality of icons in conjunction with said unique indicators, each icon corresponding to a network component and indicating a physical type of the corresponding to a network component and further displaying links connecting at least of one said icons to at least one other of said icons, each link illustrating a relative communication relationship between linked network components;

simultaneously displaying in said node detail section information pertaining to each of the selected entities;

simultaneously displaying in said map view section a list of user-selectable metrics for allowing a user to select metrics for display in said node map section; and
simultaneously displaying in said reset section a selectable list of all entities and network components, selection of a least one entry of the selectable list providing a reset function to allow a user to perform at least one of initializing and setting a default value for at least of one said defined metrics.

2. The method according to claim 1, wherein said assigning step, comprises designating a user configurable unique indicator selected from the group consisting of a different color, a different shade and a different pattern to each of said quantized discrete level.

3. The method according to claim 1, wherein said step of determining said value comprises the steps of:
monitoring said at least one entity with at least one software agent remotely located from a machine upon which said graphical user interface resides; and
said software agents interrogating each said entity within the dynamic data space for said determined value.

4. The method according to claim 1, wherein said step of determining said value further comprises automatically updating said graphical display representations of said selected ones of said entities in said graphical user interface.

5. The method according to claim 1, wherein said selected ones of said metrics are selected from a list of metrics displayed within said graphical user interface.

6. The method according to claim 1, further comprising updating said graphical representations dynamically based upon subsequent value determinations.

7. The method according to claim 1, wherein said step of determining said value and said providing step are configurably periodic.

8. The method of claim 1, wherein said a maximum and minimum values are user configurable values.

9. A method for visualizing metrics for at least one component in a heterogeneous content delivery network (CDN), the method comprising:
defining metrics characterizing the performance of components in the CDN;
computing values for said defined metrics;
defining a maximum value and a minimum value for each of said defined metrics;
quantizing discrete levels between said defined maximum value and said defined minimum value;
assigning a unique indicator to each said quantized discrete level;
providing a graphical display of said unique indicators associated with said computed values within a graphical user interface of a machine remotely located from the component, said graphical display displaying user selected ones of said defined metrics, said graphical display changing in response to changes in said computed values and changes occurring in said components;
displaying in a node map section of said graphical display a plurality of icons in conjunction with said unique indicators, each icon corresponding to a component with the CDN and indicating a physical type of the corresponding component and further displaying links connecting at least one said icons to at least one other of said icons, each link illustrating a relative communication relationship between linked network components;
simultaneously displaying in a distinct node detail section information pertaining to each of the selected metrics;
simultaneously displaying in a distinct map view section a list of user-selectable metrics for allowing a user to select metrics for display in said node map section; and
simultaneously displaying in a distinct reset section a selectable list of all metrics and components within the CDN, selection of at least one entry of the selectable list providing a reset function to allow a user to perform at least one of initializing and setting a default value for at least one of said defined metrics.

10. The method according to claim 9, wherein said defined metrics are selected from the group consisting of CPU load, run queue size, memory usage, connections, and disk I/O usage.

11. The method according to claim 9, wherein said assigning step, comprises designating a user configurable unique indicator selected from the group consisting of a different color, a different shade, and a different pattern to each of said quantized discrete level.

12. The method according to claim 9, wherein said computing step, comprises the steps of:
monitoring said at least one component with at least one software agent remotely located from a machine upon which said graphical user interface resides; and
said software agents interrogating each one of said components for said computed values.

13. The method according to claim 9, further comprising updating said graphical display dynamically based upon subsequent value determinations.

14. The method according to claim 9, wherein said step of providing said graphical display, comprises:
providing a graphical representation of each one of said components, each one of said components represented by a node in said graphical display.

15. The method according to claim 9, wherein said defined metrics are selected from a list of metrics displayed within said graphical display.

16. The method according to claim 9, wherein said computing step and said providing step are configurably periodic.

17. A method for monitoring a component in a content delivery network (CDN), comprising:
selecting based upon user input at least one monitored metric corresponding to a component in the CDN;
determining a value for said selected metric;
assigning a discrete quantized level to said determined value based on a predefined maximum and a predefined minimum value for said selected metric;
computing a display indicator based on said assigned quantized level;
providing said display indicator on a graphical display of a machine remotely located from the component, said display indicator providing a visual representation of said monitored metric for the component in the network;
displaying in a distinct node map section of said graphical display an icon in conjunction with said display indicator, said icon corresponding to said component and indicating a physical type of said component;
simultaneously displaying in a distinct node detail section information pertaining to said component;
simultaneously displaying in a distinct map view section a list of user-selectable metrics for allowing a user to select metrics for display in said node map section; and
simultaneously displaying in a distinct reset section a selectable list providing a reset function to allow a user to perform at least one of initializing and setting a default value for said at least one monitored metric.

18. The method according to claim 17, wherein said monitored metric is selected from the group consisting of a CPU load, a network capacity, a run queue size, a connection capacity, a memory usage, a page ins capacity, a disk I/O, and a reference count.

19. The method according to claim 17, wherein said display indicator is an indicator selected from the group consisting of a color, a shade of gray, and a pattern.

20. A system for monitoring components in a content delivery network (CDN), comprising:
plurality of software agents for retrieving values for metrics from the components within a heterogeneous CDN;
a processor remotely located from said software agents for determining a user configurable graphical representation for each of said retrieved values, wherein different graphical representations are determined for different quantized ranges of said retrieved values; and
a graphical user interface of a machine remotely located from at least one of the components for presenting said determined graphical representation, said graphical user interface having a user selectable list of said metrics, said graphical user interface changing to reflect changes to said selections, wherein said graphical user interface includes four distinct sections configured, respectively, as a node map section, a node detail section, a map view section, and a reset section;
said node map section for displaying a plurality of icons in conjunction with unique indicators, each icon corresponding to a component with the CDN and indicating a physical type of the corresponding component, and further displaying links connecting at least one said icons to at least one other of said icons, each link illustrating a relative communication relationship between linked network components;
said node detail section for simultaneously displaying information pertaining to each of the selected metrics;
said distinct map view section for simultaneously displaying a list of user-selectable metrics for allowing a user to select metrics for display in said node map section; and
said distinct reset section for simultaneously displaying a selectable list of all metrics and components within the CDN, selection of at least one entry of the selectable list providing a reset function to allow a user to perform at least one of initializing and setting a default value for at least one of said defined metrics.

21. A machine readable storage having stored thereon, a computer program having a plurality of code sections for visualizing a plurality of metrics in a dynamic data space, said code sections executable by a machine for causing the machine to perform the steps of:
defining metrics, each of said defined metrics corresponding to at least one entity in the dynamic data space, wherein each entity is a network component;
defining a maximum and a minimum value for each of said metrics;
quantizing discrete levels between said defined maximum and said defined minimum value;
assigning a unique indicator to each of said quantized discrete levels;
determining a value for each of said defined metrics and responsively determining said unique indicator corresponding to said value;
receiving a user selection of particular ones of said entities via a graphical user interface;
providing graphical display representations of said unique indicators associated with said selected entities within a graphical user interface of a machine remotely located from at least one entity, said graphical user interface changing to reflect changes to said selected entities and simultaneously displaying four distinct sections configured, respectively, as a node map section, a node detail section, a map view section, and a reset section;
displaying in said node map section a plurality of icons in conjunction with said unique indicators, each icon corresponding to a network component and indicating a physical type of the corresponding network component and further displaying links connecting at least of one said icons to at least one other of said icons, each link illustrating a relative communication relationship between linked network components;
simultaneously displaying in said node detail section information pertaining to each of the selected entities;
simultaneously displaying in said man view section a list of user-selectable metrics for allowing a user to select metrics for display in said node map section; and
simultaneously displaying in said reset section a selectable list of all entities and network components, selection of a least one entry of the selectable list providing a reset function to allow a user to perform at least one of initializing and setting a default value for at least one of said defined metrics.

22. The machine readable storage according to claim 21, wherein said assigning step, comprises designating a user configurable unique indicator selected from the group consisting of a different color, a different shade and a different pattern to each of said quantized discrete level.

23. The machine readable storage according to claim 21, wherein said step of determining said value comprises the steps of:
monitoring said at least one entity with at least one software agent remotely located from a machine upon which said graphical user interface resides; and
said software agents interrogating each said entity within the dynamic data space for said determined value.

24. The machine readable storage according to claim 21, wherein said step of determining said value further comprises automatically updating said graphical display representations of said selected ones of said entities in said graphical user interface.

25. The machine readable storage according to claim 21, wherein said selected ones of said metrics are selected from a list of metrics displayed within said graphical user interface.

26. The machine readable storage according to claim 21, further comprising updating said graphical representations dynamically based upon subsequent value determinations.

27. The machine readable storage according to claim 21, wherein said step of determining said value and said providing step are configurably periodic.

28. A machine readable storage having stored thereon, a computer program having a plurality of code sections for monitoring a component in a content delivery network (CDN), said code sections executable by a machine for causing the machine to perform the steps of:
defining metrics characterizing the performance of components in the CDN;
computing values for said defined metrics;
defining a maximum value and a minimum value for each of said defined metrics;

quantizing discrete levels between said defined maximum value and said defined minimum value;

assigning a unique indicator to each said quantized discrete level;

providing a graphical display of said unique indicators associated with said computed value within a graphical user interface of a machine remotely located from the component, said graphical display displaying user selected ones of said defined metrics, said graphical display changing in response to changes in said computed values and changes occurring in said components;

displaying in a distinct node map section of said graphical display a plurality of icons in conjunction with said unique indicators, each icon corresponding to a component with the CDN and indicating a physical type of the corresponding component, and further displaying links connecting at least one of said icons to at least one other of said icons, each link illustrating a relative communication relationship between linked network components;

simultaneously displaying a distinct node detail section information pertaining to each of the selected metrics;

simultaneously displaying in a distinct map view section a list of user-selectable metrics for allowing a user to select metrics for display in said node map section; and simultaneously displaying in a distinct reset section a selectable list of all metrics and components within the CDN, selection of at least one entry of the selectable list providing a reset function to allow a user to perform at least one of initializing and setting a default value for at least one of said defined metrics.

29. The machine readable storage according to claim 28, wherein said defined metrics are selected from the group consisting of CPU load, run queue size, memory usage, connections, and disk I/O usage.

30. The machine readable storage according to claim 28, wherein maid assigning step, comprises designating a user configurable unique indicator selected from the group consisting of a different color, a different shade, and a different pattern to each of said quantized discrete level.

31. The machine readable storage according to claim 28, wherein said computing step, comprises the steps of:

monitoring said at least one component with at least one software agent remotely located from a machine upon which said graphical user interface resides; and said software agents interrogating each one of said components for said computed values.

32. The machine readable storage according to claim 28, further comprising updating said graphical display dynamically based upon subsequent value determinations.

33. The machine readable storage according to claim 28, wherein said step of providing said graphical display, comprises:

providing a graphical representation of each one of said components, each one of said components represented by a node in said graphical display.

34. The machine readable storage according to claim 28, wherein said defined metrics are selected from a list of metrics displayed within said graphical display.

35. The machine readable storage according to claim 28, wherein said computing step and said providing step are configurably periodic.

36. A machine readable storage having stored thereon, a computer program having a plurality of code sections for monitoring a component in a content delivery network (CDN), said code sections executable by a machine for causing the machine to perform the steps of:

selecting based upon user input at least one monitored metric corresponding to a component in the CDN;

determining a value for said selected metric;

assigning a discrete quantized level to said determined value based on a predefined maximum and predefined minimum value for said selected metric;

computing a display indicator based on said assigned quantized level;

providing said display indicator on a graphical display of a machine remotely located from the component, said display indicator providing a visual representation of said monitored metric for the component in the network;

displaying in a distinct node map section of said graphical display an icon in conjunction with said display indicator, said icon corresponding to said component and indicating a physical type of said component;

simultaneously displaying in a distinct node detail section information pertaining to said component;

simultaneously displaying in a distinct map view section a list of user-selectable metrics for allowing a user to select metrics for display in said node map section; and simultaneously displaying in a distinct reset section a selectable list providing a reset function to allow a user to perform at least one of initializing and setting a default value for said at least one monitored metrics.

37. The machine readable storage according to claim 36, wherein said monitored metric is selected from the group consisting of a CPU load, a network capacity, a run queue size, a connection capacity, a memory usage, a page ins capacity, a disk I/O, and a reference count.

38. The machine readable storage according to claim 36, wherein said display indicator is an indicator selected from the group consisting of a color, a shade of gray, and a pattern.

* * * * *